No. 606,749. Patented July 5, 1898.
E. A. UEHLING.
CALORIMETER OR HEAT MEASURING APPARATUS.
(Application filed Sept. 28, 1897.)
(No Model.) 3 Sheets—Sheet 1.
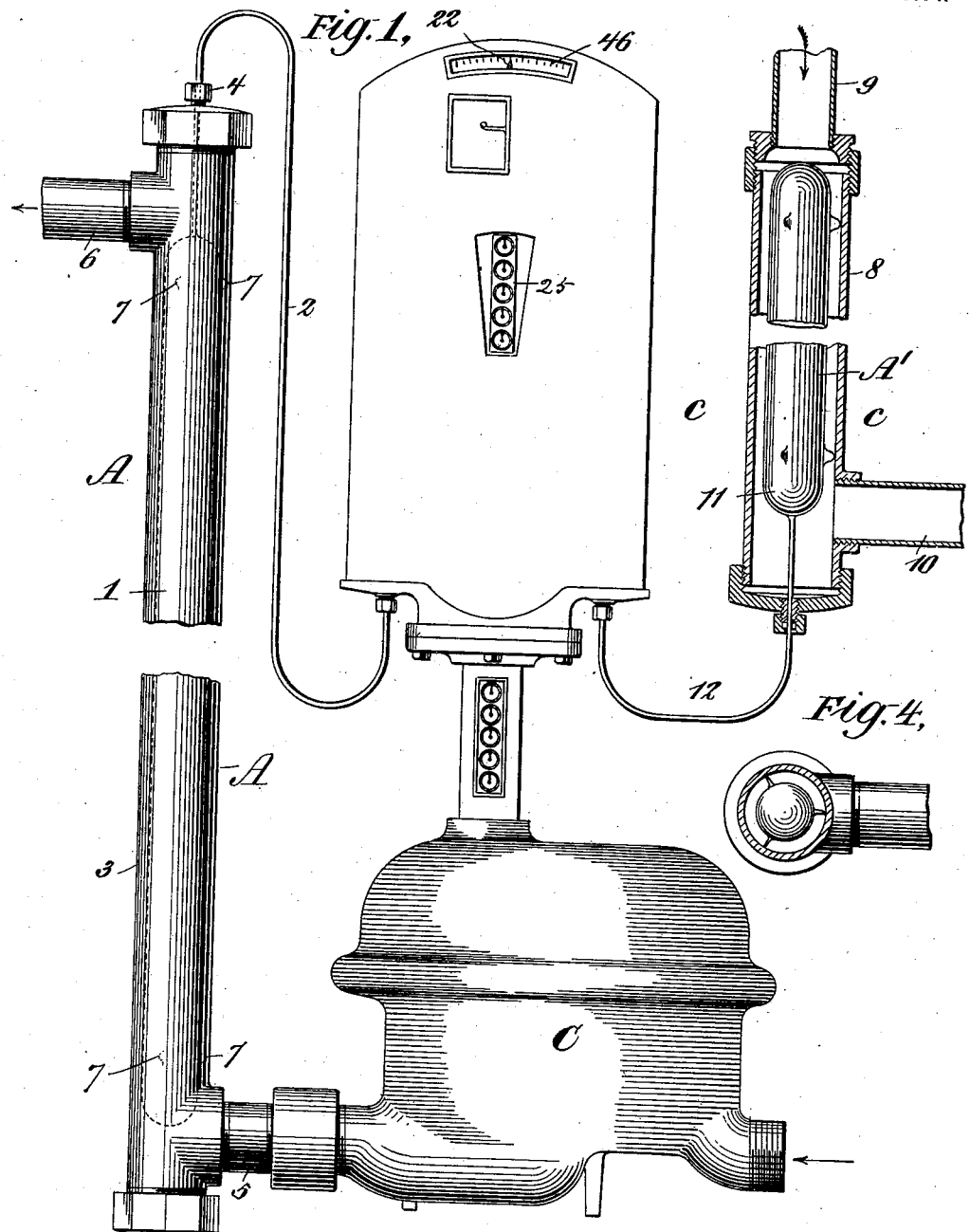
WITNESSES:
INVENTOR
Edward A. Uehling
BY
Chas. J. Carll
ATTORNEY

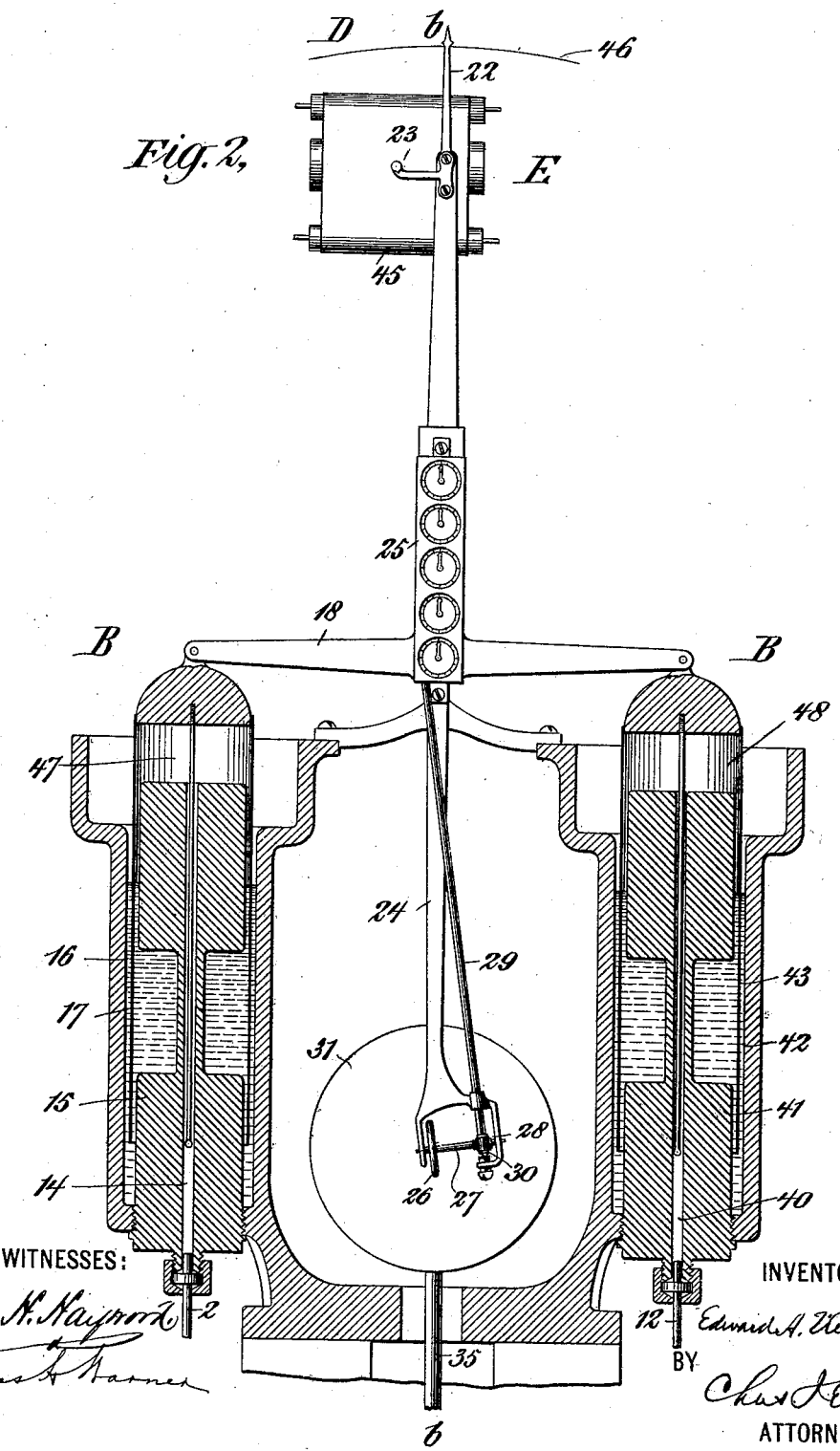

No. 606,749. Patented July 5, 1898.
E. A. UEHLING.
CALORIMETER OR HEAT MEASURING APPARATUS.
(Application filed Sept. 28, 1897.)
(No Model.) 3 Sheets—Sheet 3.
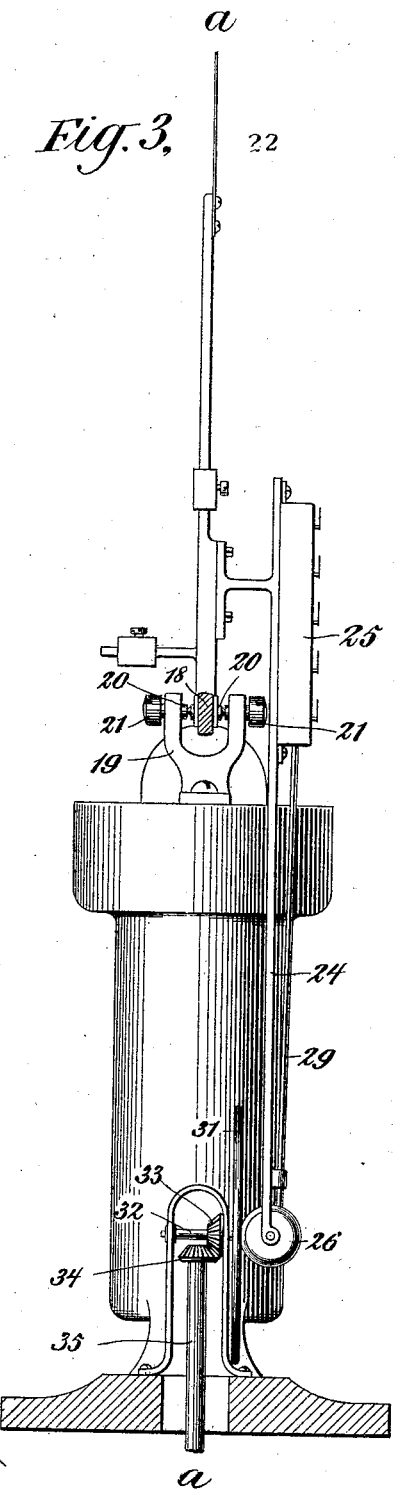
WITNESSES:
INVENTOR
BY
ATTORNEY

UNITED STATES PATENT OFFICE.

EDWARD A. UEHLING, OF NEWARK, NEW JERSEY.

CALORIMETER OR HEAT-MEASURING APPARATUS.

SPECIFICATION forming part of Letters Patent No. 606,749, dated July 5, 1898.

Application filed September 28, 1897. Serial No. 653,295. (No model.)

*To all whom it may concern:*

Be it known that I, EDWARD A. UEHLING, a citizen of the United States, and a resident of Newark, in the county of Essex and State of New Jersey, have invented a new and useful Improvement in Calorimeters or Heat-Measuring Apparatus, of which the following is a specification.

My invention relates to calorimeters, the object being to produce an apparatus which when suitably connected at two points along the course of a circulating fluid—as, for instance, at the points where the brine in a refrigerating system enters and leaves the refrigerating - chamber — shall be capable of measuring and indicating the quantity of heat abstracted from or absorbed by the fluid while passing between these points and which shall be capable of indicating the difference of temperature at the two points where connections are made and recording this difference upon a chart.

My invention consists in providing an apparatus whereby the difference in temperature at the beginning and end of the circuit of a fluid circulating through pipes or other ducts is obtained, and in making this difference of temperature control or govern the velocity ratio between a register or counting mechanism and a driving mechanism for the same operated by the fluid traversing the circuit. The said driving mechanism may consist of any suitable form of fluid-meter, so that the speed of the driving mechanism is proportional to the volume of fluid traversing the circuit. The speed with which the register or counting mechanism is operated is proportional to the product of the difference in temperature at the entrance to and exit from the circuit and the volume of fluid which traverses the circuit—that is, proportional to the quantity of heat absorbed by or extracted from the fluid.

My invention consists, further, in providing a means for making automatically a record in the form of a chart or diagram of the variations in the difference of temperature between the incoming and outgoing fluid.

This invention has many useful applications, among which may be mentioned that in connection with the refrigerating apparatus of cold-storage warehouses and the like, in which rooms or compartments are cooled by causing cold brine to circulate through a coil of pipes in them. By suitably connecting the apparatus at the two points of the circuit where the brine enters and where it leaves the room the actual quantity of cold supplied or, speaking more accurately, the actual quantity of heat absorbed from the room and its contents by the brine can be accurately measured, and the difference of temperature, and consequently the rate at which the heat is absorbed or the cold supplied, can be read off from an indicator or from the chart. Thus when articles are put into the refrigerating-room or whenever the door is opened its effect can be detected. A similar application can be made where a building is heated by the circulation of hot water in pipes and radiators.

This apparatus comprises, in a general way, two thermometers, designated generally by A and A', respectively, which are introduced into the circuit of the circulating fluid whose loss or gain of heat and temperature is to be indicated, measured, or recorded, A being introduced at the beginning and A' at the end of the circuit; mechanism, designated generally by B, connected with the thermometers A and A' and actuated by them for controlling the indicator, register, and recording device; mechanism consisting of any suitable form of fluid-meter, designated generally by C, for actuating the registering device and measuring the quantity of circulating fluid which passes through the circuit; an indicator, designated generally by D, for showing at any instant what the difference in temperature is at points of the circuit wherein the bulbs are placed; a recording-chart driven by suitable clockwork and tracing - point for same, designated in a general way by E, and a register or counting device, designated generally by F.

In the drawings accompanying and forming part of this specification, Figure 1 is a general front view of one form of the apparatus, showing the casing 8, which incloses the thermometer-bulb A' in section. Fig. 2 is an enlarged view of the recording mechanism, taken partially in section, on line $a\,a$, Fig. 3. Fig. 3 is a partial section on line $b\,b$, Fig. 2. Fig. 4 is a section through the casing 8 on line $c\,c$, Fig. 1.

In the preferred form of my invention herein shown and described the apparatus is supposed to be used in connection with a cold-storage system the rooms of which are cooled by coils of pipe, through which cold brine is made to circulate. At or near the point where the brine enters the room the meter C is connected to the supply-pipe. Near this point also and in the brine-circuit is connected the casing or pipe 3, one end being connected to a pipe 5, leading from the meter, and the other to a pipe 6, leading to the refrigerating-coil. Within the casing 3 is the thermometer A, which in the form illustrated comprises a fluid chamber or bulb 1, closed at one end and joined at the other to the small tube 2, which passes out of the casing 3 through the stuffing-box 4. The bulb 1 is provided with projections 7 7 for keeping it in a central position.

The casing 8 is similar in construction to casing 3, one end being connected to a pipe 9, which leads from the refrigerating-coil, and the other to a pipe 10, which leads back to the refrigerating source, where the brine is cooled.

Within the casing 8 is the thermometer A', herein shown as a fluid chamber or bulb 11, constructed like the bulb 1 and attached to the tube 12, which passes out of the casing 8 through the stuffing-box. The casings 3 and 8 are made of such size that the brine may pass between the casing and the inclosed bulb.

The tube 2, connected with the bulb 1, has connection at its other end with the opening 14 in the center of the core 15. The core 15 extends up into the well 16 and forms a guide for the bell-jar 17 and at the same time forms a means of communication between the tube 2 and the upper part of the bell-jar through its central opening 14.

The upper end of the bell-jar 17 is closed and is pivotally secured to the arm 18. The arm 18 is pivoted in the support 19, Fig. 3, by means of the pivot-points 20 20 on the arm engaging in recesses in the screws 21 21. Attached to the arm 18 are the indicator 22, the tracing-point 23, and the pendent arm 24, which forms a support for the register 25, the friction-wheel 26, with its shaft 27 and worm 28, and the shaft 29 and worm-wheel 30.

The friction-wheel 26 has frictional engagement with the friction-disk 31, mounted on the shaft 32, on which shaft is also secured the bevel-gear 33. The bevel-gear 33 engages the bevel-gear 34 on the shaft 35, and the shaft 35 is connected by appropriate gearing to the mechanism of the meter, so as to receive motion therefrom. The mechanism of the meter is not shown, as its specific construction forms no part of my present invention.

The tube 12, which has communication with the bulb 11 in the casing 8, is connected with the opening 40 in the core 41. The core 41 extends up into the well 42 and forms a guide for the bell-jar 43 and also forms a means of communication between the tube 12 and the upper part of the bell-jar 43 through the opening 40. The bell-jar 43 is suspended on a pivot in the end of the arm 18.

The register 25 is of any suitable construction adapted to be operated by the revolution of the shaft 29.

The tracing-point 23 is adapted to have contact with the chart 45, the said chart consisting, preferably, of a continuous roll of paper and operated in the usual manner by suitable clockwork.

The dial or scale 46 is arranged beneath the pointer or indicator 22, so that the position of the indicator relative to the scale shall correspond to the difference of temperature of the incoming and outgoing fluid or brine, as will be more fully explained hereinafter.

The wells 16 and 42 are partially filled with liquid, preferably mercury, for the purpose of preventing the escape of the fluid in the chambers 47 and 48 in the upper part of the bell-jars 17 and 43. The chamber 47 is in open communication at all times with the interior of the bulb 1 and the chamber 48 with the bulb 11.

The bulbs 1 and 11 and the chambers 47 and 48 are filled with any suitable fluid, air or alcohol being preferred.

The operation of the apparatus is as follows: From the position of the bulbs 1 and 11 in the casings 3 and 8 all of the brine that passes through the circuit has to pass by and around the bulbs, and in this way the temperature of the brine is imparted to the bulbs and to the fluids within them. The parts are adjusted to take the position shown in Figs. 1 and 2 when the temperature of the fluids in the bulbs 1 and 11 is the same, which would be the case if the brine left the refrigerating-room through casing 8 at the same temperature it had on entering through casing 3—that is, in case the brine neither lost nor gained heat during its circuit. The tendency of the arms 18 and 24 is always to assume the position shown in Fig. 2, and they will assume this position when the temperature and consequently the pressure of the fluids in the bulbs 1 and 11 are the same. Thus if the arm 18 is rotated to the left, as seen in Fig. 2, the bell-jar 17 will be immersed deeper into the mercury in the well 16, and the bell-jar 43 will be withdrawn a corresponding amount from the mercury in the well 42, thereby, because of the different amounts of the mercury displaced by the two bell-jars, tending to rotate the arm 18 back to the position of equilibrium. This tendency may be increased or diminished by making the arm 24 heavier or lighter or by increasing the thickness of the walls of the bell-jars. If now the brine has absorbed heat in passing through the refrigerating-coils, its temperature will be raised and the increased temperature will be imparted to the fluid in the bulb 11, thereby tending to expand the said fluid and increasing the upward pressure which it exerts upon the bell-jar 43 in the chamber 48. This will cause the arm 18 to rotate to the left, as seen in Fig. 2, thereby immersing the bell-jar 17 deeper in the well 16 and withdrawing the bell-jar 43 a corresponding amount from the well 42 until equilibrium is established. The movement of the arm 18 carries with it the indicator 22, the tracing-point 23, and the friction-wheel 26. The indicator 22 will thus indicate on the scale 46 the difference in temperature, and the tracing-point 23 will trace on the chart 45 a line which will indicate what the difference in temperature was at any particular time, the chart 45 being driven by a suitable clock and preferably being ruled by transverse lines showing days, hours, and minutes, and by longitudinal lines showing degrees of temperature.

The friction-disk 31, as has been explained, is driven by the meter C, so that it rotates at a speed proportional to the amount of brine which passes through the circuit. The friction-wheel 26, which is adapted to be held in the center of the disk when the temperature of the bulbs 1 and 11 is the same, will be carried out from the center an amount proportional to the difference in temperature of the incoming and outgoing brine. The velocity ratio, therefore, between the friction-disk and the friction-wheel will depend upon the amount that the friction-wheel is removed from the center of the friction-disk—that is, proportional to the difference in temperature of the incoming and outgoing brine. The actual number of revolutions that the friction-wheel will make in a unit of time—say an hour—will therefore be proportional to the product of the number of revolutions made by the friction-disk and the difference in temperature between the incoming and outgoing brine—that is, proportional to the quantity of heat absorbed by the brine in one hour. The worm 28 and worm-wheel 30 are proportioned so that the register 25, operated by the shaft 29, will indicate the actual number of heat-units absorbed by the brine.

In the operation just described it is assumed, for the sake of simplicity, that the fluid entered its circuit at a constant temperature. It will, however, be readily understood that the apparatus will perform its several functions with equal certainty and effect when there are changes in the temperature at either or both of the incoming or outgoing points.

It is also obvious that in a system where the heat-conveying fluid is maintained at a constant temperature or where the variations in temperature are so small as to be of no importance at the incoming and outgoing points it will be necessary to use only one thermometer and set of connections between such thermometer and the indicator, the register, and recording device.

Having thus explained my invention, what I claim is—

1. In a heat-measuring apparatus, the combination with two fluid-chambers, of a bell-jar dipping into a well containing mercury and suspended to an arm pivoted at or near its center, the space in the upper part of said bell-jar having communication with one of said fluid-chambers, another bell-jar and well of like construction and having communication with the other of said fluid-chambers and an indicator attached to said arm, whereby the indicator is made to show the difference in temperature of the fluids contained in said fluid-chambers.

2. In a heat-measuring apparatus, the combination with two fluid-chambers of a bell-jar dipping into a well containing mercury and suspended to an arm pivoted at or near its center, the space of the upper part of said bell-jar having communication with one of said fluid-chambers, another bell-jar and well of like construction and having communication with the other of said fluid-chambers, a chart mechanism and a tracing-point adapted to have contact therewith attached to said arm, whereby the difference in temperature of the fluids contained in said bulbs is recorded.

3. In a heat-measuring apparatus, the combination with two thermometers adapted to be introduced at the beginning and end, respectively, of the circuit of a heat-conveying fluid of a fluid-meter introduced into said circuit, a registering device connected to said meter by friction-gearing and means controlled by said thermometers, whereby the velocity ratio between the said registering device and the fluid-meter is made to correspond to the difference in temperature of the heat-conveying fluid at the points where the thermometers are introduced.

4. In a heat-measuring apparatus, the combination with two fluid-chambers adapted to be introduced at the beginning and end, respectively, of the circuit of a heat-conveying fluid, a fluid-meter introduced into the circuit of the said circulating fluid, a register actuated by said meter and means connected with said fluid-chambers, whereby the speed of said register relative to that of said meter is controlled.

5. In a heat-measuring apparatus, the combination with two fluid-chambers adapted to be introduced at the beginning and end, respectively, of a circuit of a heat-conveying fluid, of a fluid-meter introduced into said circuit, a register or counter connected by friction-gearing with said meter, a bell-jar, dipping into a well containing mercury and having the space in its upper part in open communication with one of said fluid-chambers, and attached to an arm, said arm being pivoted at or near its center and carrying at its opposite end a similar bell-jar connected in like manner to the other fluid-chamber, and means connected with said arm whereby the speed of said counter relative to that of the meter is controlled.

6. In a heat-measuring apparatus, the combination with a thermometer adapted to be introduced into the circuit of a heat-conveying fluid, a fluid-meter introduced into said circuit, a register, a friction-disk geared to said meter, a friction-wheel having contact therewith geared to said register and a lever actuated by said thermometer and attached to said friction-wheel, whereby the position of said friction-wheel relative to said friction-disk is determined.

7. In an apparatus for measuring the heat gained or lost by a fluid flowing through a system of pipes or ducts, the combination of a register or counter, a meter operated by the flow of said fluid through said pipes or ducts, a friction-disk driven by said meter and a friction-wheel engaging said disk and geared to said register, and means controlled by the difference in temperature at two points along the course of said flow, whereby the velocity ratio between said friction-wheel and said friction-disk is governed and the register made to indicate the quantity of heat gained or lost by the fluid in its circuit.

8. In a calorimeter or heat-measuring apparatus, the combination with the circuit of a heat-conveying fluid of an indicator, a chart mechanism, a tracing-point adapted to have contact therewith, a fluid-meter introduced into the circuit of said heat-conveying fluid, a register or counting device actuated by said meter, two thermometer-bulbs introduced at the beginning and end, respectively, of the circuit of said heat-conveying fluid, and means whereby difference in temperature of the fluids contained in said thermometer-bulbs is made to control the indicator, the tracing-point and the register, whereby the difference in temperature at the points where the bulbs are introduced is indicated and recorded, and the quantity of heat gained or lost by the fluid passing between these two points is registered.

9. In the described heat-measuring apparatus, the combination of the bulbs 1 and 11, the arm 18, the bell-jars 17 and 43 attached thereto the register 25 geared to the friction-wheel 26 the arm 24 attached to the arm 18 and carrying the said friction-wheel, the friction-disk 31 and the fluid-meter C geared to said friction-disk.

10. In a heat-measuring apparatus, the combination with a thermometer adapted to be introduced into the circuit of a heat-conveying fluid, of a fluid-meter introduced into said circuit, a registering device actuated by said meter, and means connected with said thermometer for controlling the velocity ratio or relative speed between the registering device and the fluid-meter.

In testimony that I claim the foregoing as my invention I have signed my name, in presence of two witnesses, this 24th day of September, 1897.

EDWARD A. UEHLING.

Witnesses:
WM. BONDY,
CHARLES L. LIVINGSTON.